(12) United States Patent
Reitzloff et al.

(10) Patent No.: US 7,938,483 B2
(45) Date of Patent: May 10, 2011

(54) MOVABLE VEHICULAR ROOF

(75) Inventors: Cliff R. Reitzloff, Northville, MI (US); Michael J. Urban, Coral Springs, FL (US); Nilesh Wickham, Troy, MI (US); Dave Slanec, Royal Oak, MI (US)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 391 days.

(21) Appl. No.: 11/805,700

(22) Filed: May 24, 2007

(65) Prior Publication Data

US 2008/0290696 A1 Nov. 27, 2008

(51) Int. Cl.
B60J 7/06 (2006.01)

(52) U.S. Cl. ........................................... 296/219
(58) Field of Classification Search ................ 296/219
See application file for complete search history.

(56) References Cited

U.S. PATENT DOCUMENTS

| | | | |
|---|---|---|---|
| 1,910,075 A | 5/1933 | Westad | |
| 2,042,431 A | 6/1936 | Hooper | |
| 2,103,372 A | 12/1937 | Lange | |
| 2,580,337 A | 12/1951 | Votypka | |
| 2,985,483 A | 5/1961 | Bishop et al. | |
| 3,298,731 A | 1/1967 | Sangimino | |
| 3,658,378 A * | 4/1972 | Sutren | 296/219 |
| 3,702,430 A | 11/1972 | Knetsch et al. | |
| 3,953,067 A | 4/1976 | Isola | |
| 3,960,404 A | 6/1976 | Bienert | |
| 4,063,774 A | 12/1977 | Hanks | |
| 4,085,965 A | 4/1978 | Schlapp et al. | |
| 4,143,907 A | 3/1979 | Ireland et al. | |
| 4,227,739 A | 10/1980 | Sorensen | |
| 4,272,121 A | 6/1981 | Kim | |
| 4,329,594 A | 5/1982 | Bohm | |
| 4,371,204 A | 2/1983 | George et al. | |
| 4,502,726 A | 3/1985 | Adams | |
| 4,556,835 A | 12/1985 | Vogel et al. | |
| 4,561,691 A | 12/1985 | Kawai et al. | |
| 4,629,953 A | 12/1986 | Inoue et al. | |
| 4,630,858 A | 12/1986 | Bez et al. | |
| 4,644,699 A | 2/1987 | Chandler et al. | |

(Continued)

FOREIGN PATENT DOCUMENTS

DE 1 288 929 2/1969

(Continued)

OTHER PUBLICATIONS 16 color photographs of the rear roof movement of a 1965 Studebaker Wagonaire, offered for sale and publicly used in 1965.

(Continued)

*Primary Examiner* — Dennis H Pedder
(74) *Attorney, Agent, or Firm* — Harness, Dickey & Pierce, P.L.C.

(57) ABSTRACT

A soft top roof system for an automotive vehicle roof system having a track with a lift ramp, a slider that is moveable along the track, and an arm connected to the slider at a pivot and moveable from a neutral position to a lift position. The system includes at least two cross bow connections located on the arm above the pivot point and a guide located on the arm opposite the at least two cross bow connections, the guide moves along the lift ramp.

20 Claims, 11 Drawing Sheets

U.S. PATENT DOCUMENTS

| | | | |
|---|---|---|---|
| 4,733,145 A | 3/1988 | Ohashi et al. | |
| 4,811,985 A | 3/1989 | Kruger et al. | |
| 4,830,428 A * | 5/1989 | Masuda et al. | 296/219 |
| 4,835,449 A | 5/1989 | Huehn | |
| 4,893,868 A * | 1/1990 | Miller et al. | 296/219 |
| 4,910,445 A | 3/1990 | Borrmann et al. | |
| 4,968,090 A | 11/1990 | Schleicher et al. | |
| 4,991,902 A | 2/1991 | Schrader et al. | |
| 5,018,783 A | 5/1991 | Chamings et al. | |
| 5,052,747 A * | 10/1991 | Kubota et al. | 296/219 |
| 5,121,958 A | 6/1992 | Goeden et al. | |
| 5,141,283 A | 8/1992 | Omoto et al. | |
| 5,152,577 A | 10/1992 | Omoto et al. | |
| 5,169,206 A | 12/1992 | Omoto et al. | |
| 5,185,562 A | 2/1993 | Huyer et al. | |
| 5,203,605 A | 4/1993 | Grimm et al. | |
| 5,225,747 A | 7/1993 | Helms et al. | |
| 5,242,210 A | 9/1993 | Fujisawa et al. | |
| 5,250,882 A | 10/1993 | Odoi et al. | |
| 5,310,241 A * | 5/1994 | Omoto et al. | 296/219 |
| 5,451,849 A | 9/1995 | Porter et al. | |
| 5,540,478 A | 7/1996 | Schuch et al. | |
| 5,551,197 A | 9/1996 | Repp et al. | |
| 5,704,173 A | 1/1998 | Repp et al. | |
| 5,734,727 A | 3/1998 | Flaherty et al. | |
| 5,746,475 A | 5/1998 | Caye et al. | |
| 5,825,147 A | 10/1998 | Porter et al. | |
| 5,836,644 A * | 11/1998 | Smith | 296/219 |
| 5,898,392 A | 4/1999 | Bambini et al. | |
| 5,934,727 A | 8/1999 | Storc et al. | |
| 5,944,378 A | 8/1999 | Mather et al. | |
| 5,951,100 A | 9/1999 | Ewing et al. | |
| 5,961,177 A | 10/1999 | Caye et al. | |
| 6,010,180 A | 1/2000 | Bureau et al. | |
| 6,030,022 A | 2/2000 | Bormann et al. | |
| 6,074,078 A | 6/2000 | Georgeff et al. | |
| 6,114,819 A | 9/2000 | Porter et al. | |
| 6,119,760 A | 9/2000 | Poole | |
| 6,217,096 B1 | 4/2001 | Koiwa et al. | |
| 6,246,199 B1 | 6/2001 | Porter et al. | |
| 6,288,511 B2 | 9/2001 | Porter et al. | |
| 6,305,740 B1 | 10/2001 | Staser et al. | |
| 6,322,137 B1 | 11/2001 | Munsters et al. | |
| 6,325,436 B1 | 12/2001 | Ehrenberger et al. | |
| 6,325,452 B1 | 12/2001 | Sanders et al. | |
| 6,340,204 B1 | 1/2002 | Seifert et al. | |
| 6,345,859 B1 | 2/2002 | Thomas et al. | |
| 6,398,296 B1 | 6/2002 | Mayer et al. | |
| 6,412,859 B1 | 7/2002 | Wilhelmus Thijssen et al. | |
| 6,416,104 B1 | 7/2002 | Fisher et al. | |
| 6,428,090 B1 | 8/2002 | Reinsch et al. | |
| 6,431,644 B1 | 8/2002 | Nagashima et al. | |
| 6,454,346 B1 | 9/2002 | Nabuurs et al. | |
| 6,478,355 B1 | 11/2002 | Van Eden et al. | |
| 6,478,368 B1 | 11/2002 | de Gaillard et al. | |
| 6,485,094 B2 | 11/2002 | Corder et al. | |
| 6,494,528 B2 | 12/2002 | Tolinski et al. | |
| 6,497,448 B1 | 12/2002 | Curtis et al. | |
| 6,517,135 B2 | 2/2003 | de Gaillard et al. | |
| 6,520,570 B2 | 2/2003 | Schatzler et al. | |
| 6,568,732 B2 | 5/2003 | De Gaillard et al. | |
| 6,568,751 B2 * | 5/2003 | Reinsch | 296/219 |
| 6,604,782 B2 | 8/2003 | De Gaillard et al. | |
| 6,634,699 B2 | 10/2003 | Collins et al. | |
| 6,672,638 B2 | 1/2004 | Corder et al. | |
| 6,676,189 B2 | 1/2004 | Schall et al. | |
| 6,676,192 B2 | 1/2004 | Marold et al. | |
| 6,783,172 B2 | 8/2004 | De Gaillard et al. | |
| 6,860,549 B2 | 3/2005 | Engelgau | |
| 6,866,335 B2 | 3/2005 | Tolinski et al. | |
| 6,899,382 B2 | 5/2005 | Engelgau | |
| 6,918,629 B2 * | 7/2005 | Nellen et al. | 296/219 |
| 6,926,354 B2 | 8/2005 | Munsters et al. | |
| 6,948,760 B2 | 9/2005 | Marx et al. | |
| 7,004,530 B2 | 2/2006 | Marx et al. | |
| 7,051,781 B2 | 5/2006 | Grimm et al. | |
| 7,114,769 B2 | 10/2006 | Storc et al. | |
| 7,163,260 B2 | 1/2007 | Reitzloff et al. | |
| 7,303,227 B2 * | 12/2007 | Reitzloff et al. | 296/219 |
| 7,399,030 B2 * | 7/2008 | Reitzloff et al. | 296/219 |
| 2002/0089204 A1 | 7/2002 | Fisher et al. | |
| 2003/0085594 A1 | 5/2003 | Engelgau | |
| 2004/0017097 A1 | 1/2004 | Albert et al. | |
| 2004/0051347 A1 | 3/2004 | Manders et al. | |
| 2005/0110304 A1 | 5/2005 | Engelgau | |
| 2005/0134096 A1 | 6/2005 | Fallis et al. | |
| 2005/0280290 A1 | 12/2005 | Urban et al. | |
| 2005/0280291 A1 * | 12/2005 | Storc et al. | 296/219 |
| 2005/0280293 A1 * | 12/2005 | MacNee et al. | 296/219 |
| 2006/0145518 A1 | 7/2006 | Evans et al. | |

FOREIGN PATENT DOCUMENTS

| | | |
|---|---|---|
| EP | 0376203 | 7/1990 |
| EP | 0466529 | 1/1992 |
| EP | 0774371 | 5/1997 |
| GB | 2077461 | 12/1981 |
| GB | 2184404 | 6/1987 |
| JP | 63-103733 | 5/1988 |
| JP | 3-159818 | 7/1991 |
| JP | 3-197232 | 8/1991 |

OTHER PUBLICATIONS 2 factory photographs of a 1963 Studebaker Wagonaire, published 1963.

1 blueprint of the roof assembly for the Studebaker Wagonaire, published, offered for sale, and/or publicly used about 1963.

2 web pages illustrating a 2004 GMC Envoy XUV with an opened roof, offered for sale in 2004.

Webasto Hollandia 400 brochure, 2 pages, published 2003.

Webasto sliding sunroof and headliner restoration on a 1959 Mercedes-Benz Type 220S Ponton sedan, 16 pages, published Aug. 7, 2002.

Advertisement—View to the Cosmos, ASC Inc., Automotive News, p. 3, Jan. 9, 2006 (1 page).

Advertisement—InfiniVu™ Roof Systems, ASC®, Automotive News, pp. 16B-16C, Dec. 18, 2006 (2 pages).

* cited by examiner

MOVABLE VEHICULAR ROOF

BACKGROUND

The present disclosure generally relates to automotive vehicles and, more particularly, to a moveable flexible roof for use in an automotive vehicle.

It is known to employ flexible roof covers for automotive vehicles. For example, a flexible roof cover can be retracted by winding it around a spring loaded roller. Such designs are disclosed in U.S. Pat. No. 1,245,278 to Sherman issued Nov. 6, 1917; and U.S. Pat. No. 3,658,378 to Sutren issued Apr. 25, 1972. More recent variations of single and flexible sunroof covers are disclosed in U.S. Pat. No. 5,018,783 to Chamings et al. issued May 28, 1991; and U.S. Pat. No. 7,163,260 Reitzloff et al. issued Jan. 16, 2007. All of these patents are incorporated by reference herein. Many of these flexible roof covers are limited to small vehicles. As the size of the flexible roof increases, problems such as roof chatter and oscillation occur due to aerodynamic effects occurring while a vehicle is traveling at higher rates of speed. Thus, there is a need for a new apparatus and methods for the deployment of flexible roofs in automotive vehicles.

SUMMARY

In accordance with the present invention, an automotive vehicle open air system is provided. A further aspect of the present invention employs a sunroof lift assembly having a track with a lift ramp, a slider that is moveable along the track, and an arm connected to the slider at a pivot point and moveable from a neutral position to a lift position. Another aspect of the present invention includes at least two cross bow connections located on the arm above the pivot point and a guide located on the arm and the guide moves along the lift ramp. In yet another aspect of the present invention, a device and a method of stabilizing a flexible moveable roof in an open position is employed and includes lifting a front bow of the roof above a seal moving the front bow along a track towards the rear of the vehicle, moving a first lift, and stabilizing the first lift arm in a raised position. Further areas of applicability will become apparent from the description provided herein. It should be understood that the description and specific examples are intended for purposes of illustration only and are not intended to limit the scope of the present disclosure.

DETAILED DESCRIPTION

The present invention provides a device and methods related to an air system for automotive vehicles. With reference to FIGS. 1-7, a preferred embodiment of an open air system 100 of the present invention includes a movable surface 110, parallel tracks 101 and 102, a drive mechanism to operably moving moveable surface 110 along parallel tracks 101 and 102, and an actuator to control the drive mechanism.

Open air system 100 is attached to the vehicle 121 by a front track 190 which may be fastened by an adhesive and fasteners. The fastener may be a plug fastener, a lock type fastener, a screw, a rivet, a weld, or any such known fastener. A front bow 210 includes a top member 211 and the top member 211 includes a connection channel 215. Front bow 210 further includes a bottom member 212 which is fastened to the top member 211.

A cover material 130 of movable surface 110 is a sheet that may made of cloth fabric, a polymeric material, a synthetic blend, and the like. Cover material 130 is mated with an underlayment sheet 136, which are bound together by a binding member 138, such as a sewn seam. The underlayment sheet 136 may be a plastic or polymeric material for improved wear and glide when opening and closing movable surface 110. Underlayment sheet 136 may be chosen so that when it is in contact with a seal 103, the movement of movable surface 110 does not produce wear points in seal 103. Underlayment sheet 136 is attached to a Z-bracket 139 which is secured between top member 211 and bottom member 212 of forward bow 210. A headliner 132 may be optionally connected to forward bow 210 using a hook-and-loop fastener 135. A vehicle interior trim panel 137 wraps around front track 190. The moveable surface 110 can further include a padding 219. Padding 219 serves to insulate against temperature, mute external noise, and/or for absorbs the impact of outside elements such as rain, sleet and wind. Moveable surface 110 can be in operable contact with the seal 103 with assistance from tension cable 254.

Figure 1:
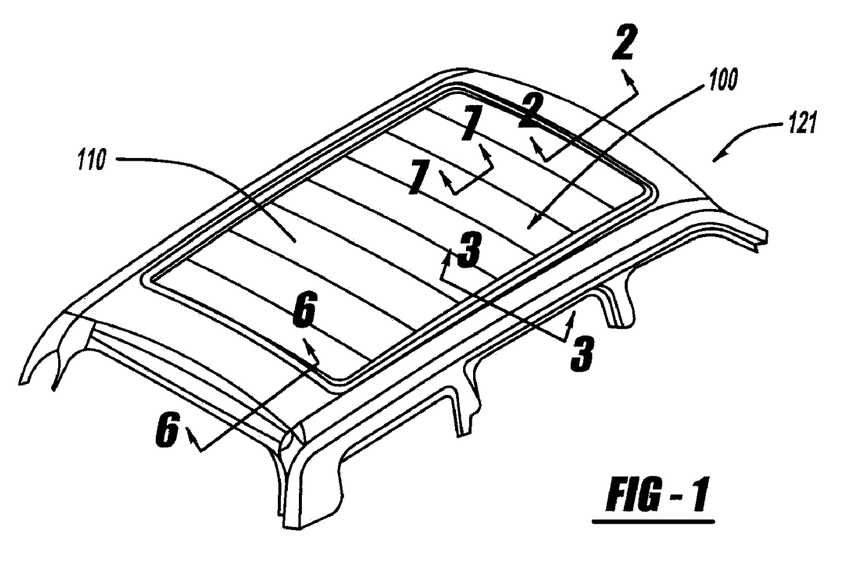
FIG. 1 is a perspective view showing an open air system according to the present disclosure.
Figure 2:
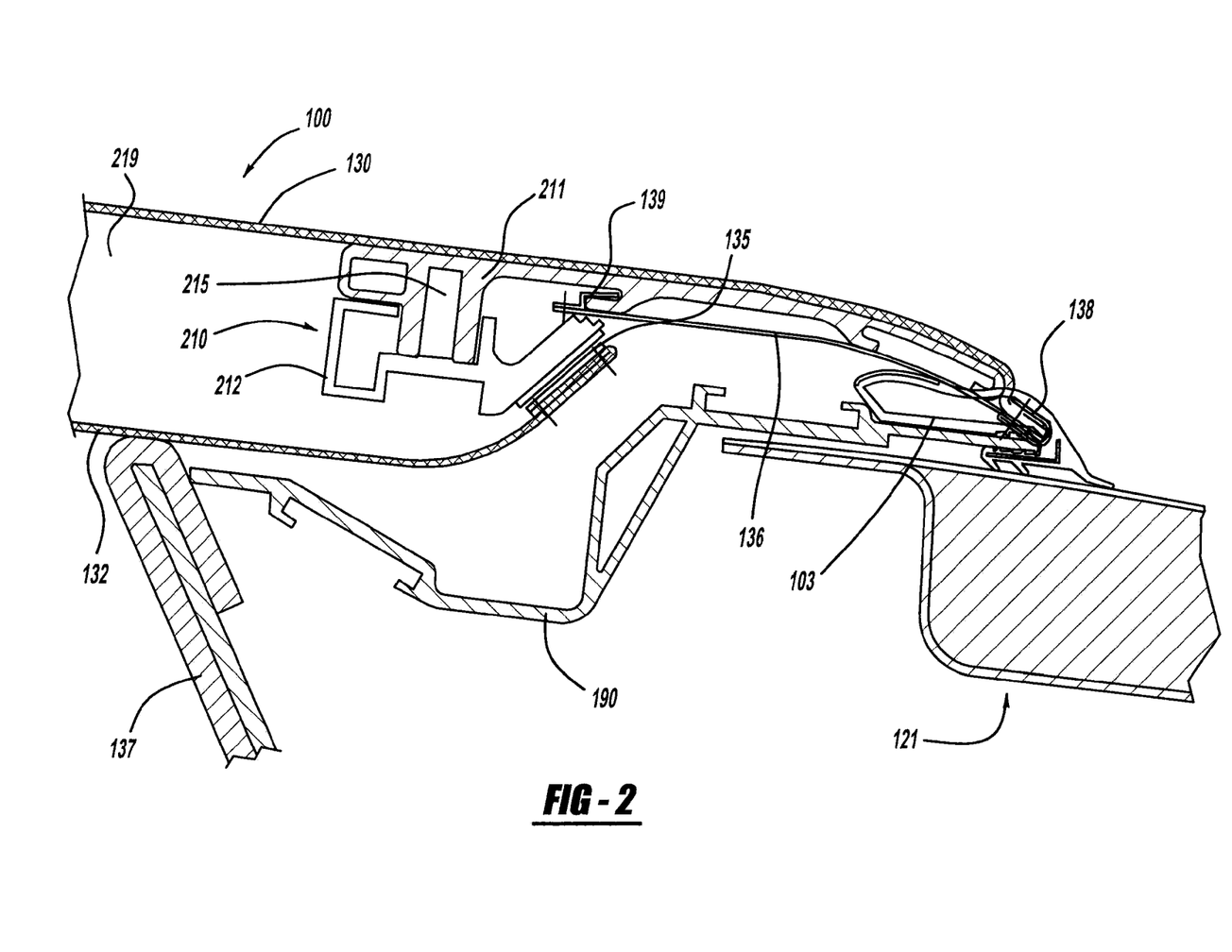
FIG. 2 is a cross-sectional view, taken along line 2-2, of FIG. 1 showing the open air system according to the present disclosure.
Figure 3:
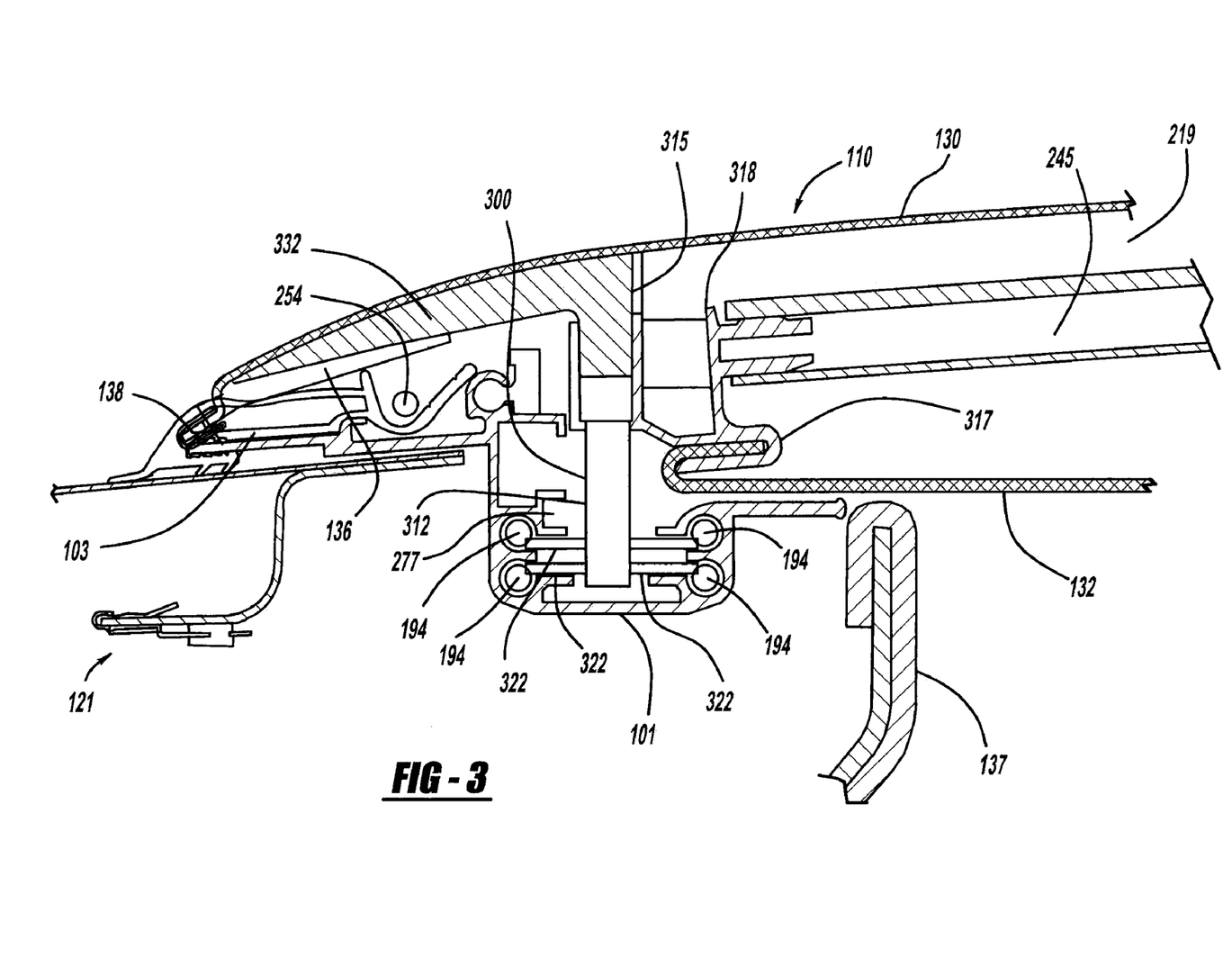
FIG. 3 is a cross-sectional view, taken along line 3-3, of FIG. 1 showing the open air system according to the present disclosure.

Movable surface 110 engages a weatherstrip or seal 103 such that binding member 138 moves seal 103 when the open air system 100 is in a closed position (see FIGS. 2 and 3). This forms a seal that prevents moisture, dirt, and other environmental debris from entering the vehicle 121 when the open air system 100 is closed.

FIG. 3 illustrates moveable surface 110 including a cross bow 245 which spans across a roof opening in vehicle 121 from first track 101 to second track 102. Cross bow 245 is connected to a lift assembly 300 which is mounted in first track 101 while the other side of cross bow 245 is connected to a mirror image of lift assembly 300 which is in second track 102. First track 101 includes a plurality of cable guides 192 and a lift ramp 220. First track 101 further includes a slider channel 277. First track 101 and second track 102 are attached to a stationary roof panel of vehicle 121 using fasteners, adhesive, or combinations of both. Second track 102 is a mirror image of first track 101. Tracks 101, 102 are arranged on the frame rails of vehicle 121 such that first track 101 is substantially parallel to second track 102.

Figure 4:
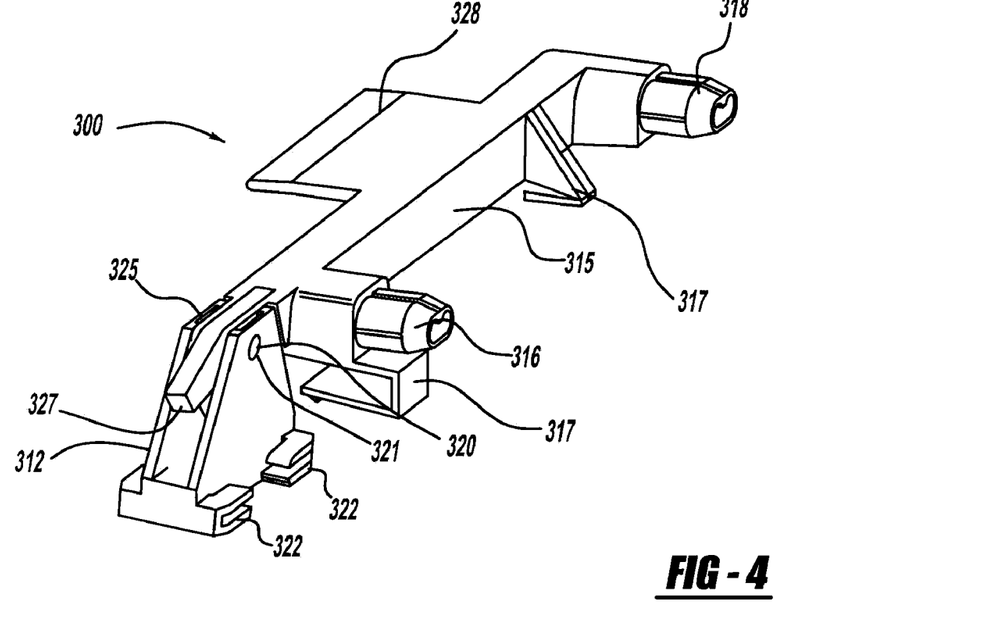
FIG. 4 is a perspective view showing a lift assembly employed in the open air system, according to the present disclosure.
Figure 5:
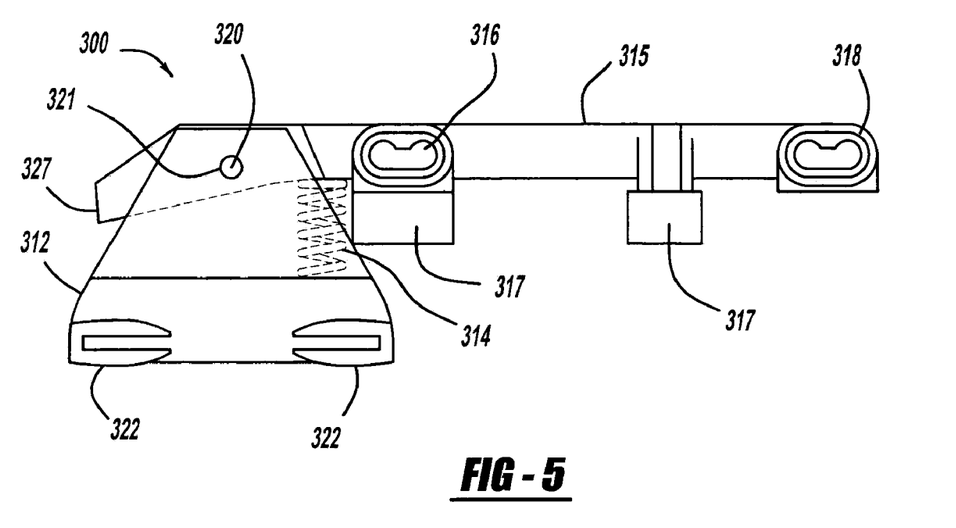
FIG. 5 is a side elevational view showing the lift assembly employed in the open air system, according to the present disclosure.

Lift assembly 300 is illustrated in greater detail in FIGS. 4 and 5. Lift assembly 300 is used in the opening and closing of open air system 100. Lift assembly 300 is advantageous in allowing better vertical in opening moveable surface 110 and an improved neutral position when moveable surface 110 is in a closed position. An improved neutral position seals moveable surface 110 to outside elements and air gusts, and can help prevent buffeting and/or chatter in moveable surface 110 when vehicle 121 is driven at higher speeds. Other advantages include that lift assembly 300 is preferably manufactured using only three parts including a spring 314 which reduces expense and improves reliability. In addition, lift assembly 300 is advantageous in raising moveable surface 110 above tracks 101, 102, thus minimizing wear to seal 103 and moveable surface 110.

Lift assembly 300 includes a slider piece 312 and a lift arm 315. Slider piece 312 is designed so that feet 322 ride in tracks 101, 102. In addition, slider piece 312 has a through hole 321 and recessed areas 325 for making assembly of lift assembly 300 easier.

Lift arm 315 includes two appendages 318 and 316 and a pin 320 which fits into hole 321 during assembly. Pin 320 is the pivot point for operation of lift assembly 300. Lift arm 315 can be shaped to have a cam and/or stops to allow for the best angles of opened and neutral (closed) position. For example, lift arm 315 includes a stopping surface 327 such that when lift arm 315 is in a fully extended open position, lift arm 315 is stopped at its maximum angle so that moveable surface 110 does not fold over on itself, which can minimize breakage of any other lift assembly 300 in the system. Lift arm 315 includes a flag 328 which assists in keeping movable surface 110 operably taut in a closed position. Furthermore, lift assembly 300 can employ a coil compression spring 314 which is attached to lift arm 315 and slider piece 312 between pivot pin 321 and appendage 316.

Lift assembly 300 comprises at least one clip 317 on lift arm 315 which holds headliner 132 (see FIG. 3). Clip 317 keeps headliner 132 above tracks 101, 102 as well as above seal 103 in order to reduce the wear on headliner 132. In addition, this can prevent dirt and grime collected on tracks 101, 102 and seal 103 from being transferred to headliner 132. Lift arm 315 is constructed such that attachment appendages 318 and 316 are above the pivot pin 321 in an open position. This is advantageous since it raises movable surface 110 above tracks 101, 102 such that as moveable surface 110 is opened it does not ride along tracks 101, 102 but rather is raised to avoid wear points in the folds of movable surface 110 when it is being opened and closed or operated in the open position.

Figure 6:
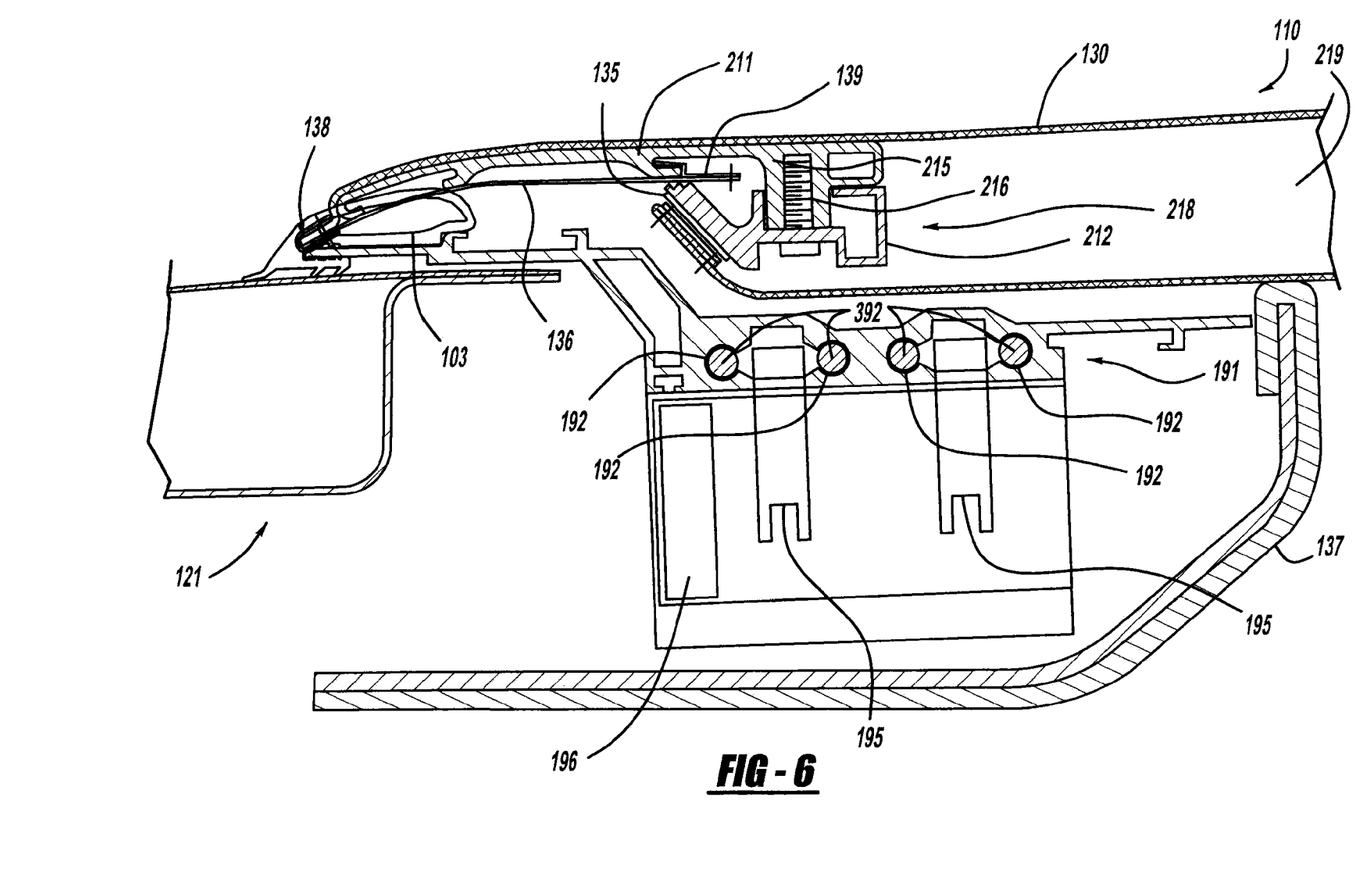
FIG. 6 is a cross-sectional view, taken along line 6-6, of FIG. 1 showing the open air system according to the present disclosure.

With reference to FIG. 6, a cross sectional view of a rear bow 218 is illustrated. Rear bow 218 is an end bow of moveable surface 110 and has a design that is very similar to front bow 210. Both rear bow 218 and front bow 210 comprise a top member 211 which includes a connection channel 215. Top member 211 is connected to a bottom member 212 by a fastener 216. Rear bow 218 is engaged with seal 103 thus deterring outside elements such rain, snow, dirt and the like in the interior of vehicle 121 when moveable surface 110 is closed. Headliner 132 can be optionally connected to rear bow 218 using a hook-and-loop fastener 135. A rear track 191 can be fastened to vehicle 121 using methods described herein and may include a fastener, adhesive, or a combination of both. Rear track 191 includes cable guides 192 for drive cables 392 such that they operate along essentially the same plane. Integrated into rear track 191 is at least one electric motor 195 and more preferably two electric motors 195 which drive cables 392. An computer or electronic control unit 196 controls open air system 100. Control unit 196 can be in communication with a controller in a dashboard or a headliner console of vehicle 121, such that a driver or other vehicle occupants can control movement of open air system 100. The control unit 196 can include wires for communication with the body controller or for interfacing with the electrical system of vehicle 121. For example, motors 195 located in the rear of open air system 100. In the case of moveable surface 110 being opened from the front and the rear simultaneously, at least two motors 195 are necessary. Control unit 196 may include express open and express close options and may control prevention of pinching a finger in the closing of moveable surface 110. Drive cables 392 are connected to a glider 294 of a lift mechanism 275 and to motors 195 such that glider 294 move based on movement of the motor 195. Motor 195 has a home position and may reset home position when moveable surface 110 is closed. One or more hall effect sensors may be employed for determining the home position. Alternatively, a subassembly integrated into rear track 191 may comprise a movement mechanism for moveable surface 110 along tracks 101, 102. Examples of a movement mechanism may include but are not limited to generally rigid rods, pulley-type cables, Bowden cables, as well as gears of the motor that may directly contact a rack-like track, a jack screw, tape drive or hydraulic mechanism. In the preferred embodiment, a movement mechanism includes two motors 195 and four drive cables 392.

Figure 7:
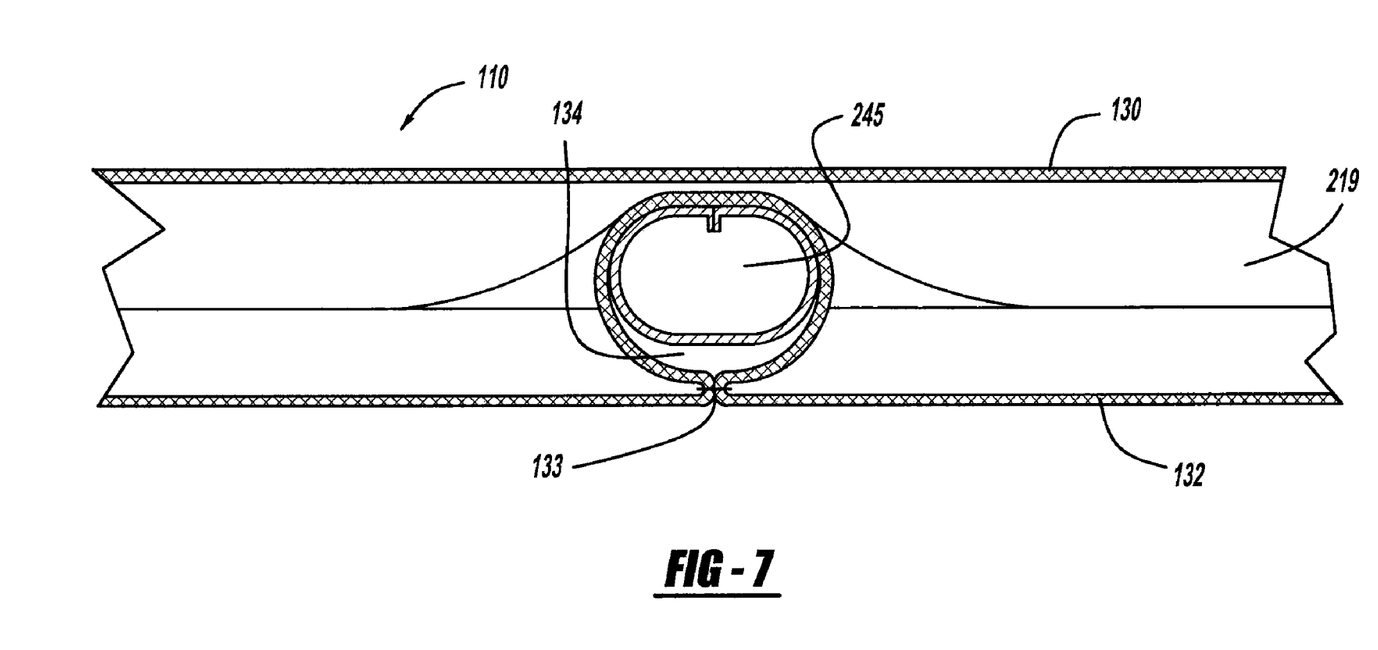
FIG. 7 is a cross-sectional view, taken along line 7-7, of FIG. 1 showing the open air system according to the present disclosure.
Figure 8:
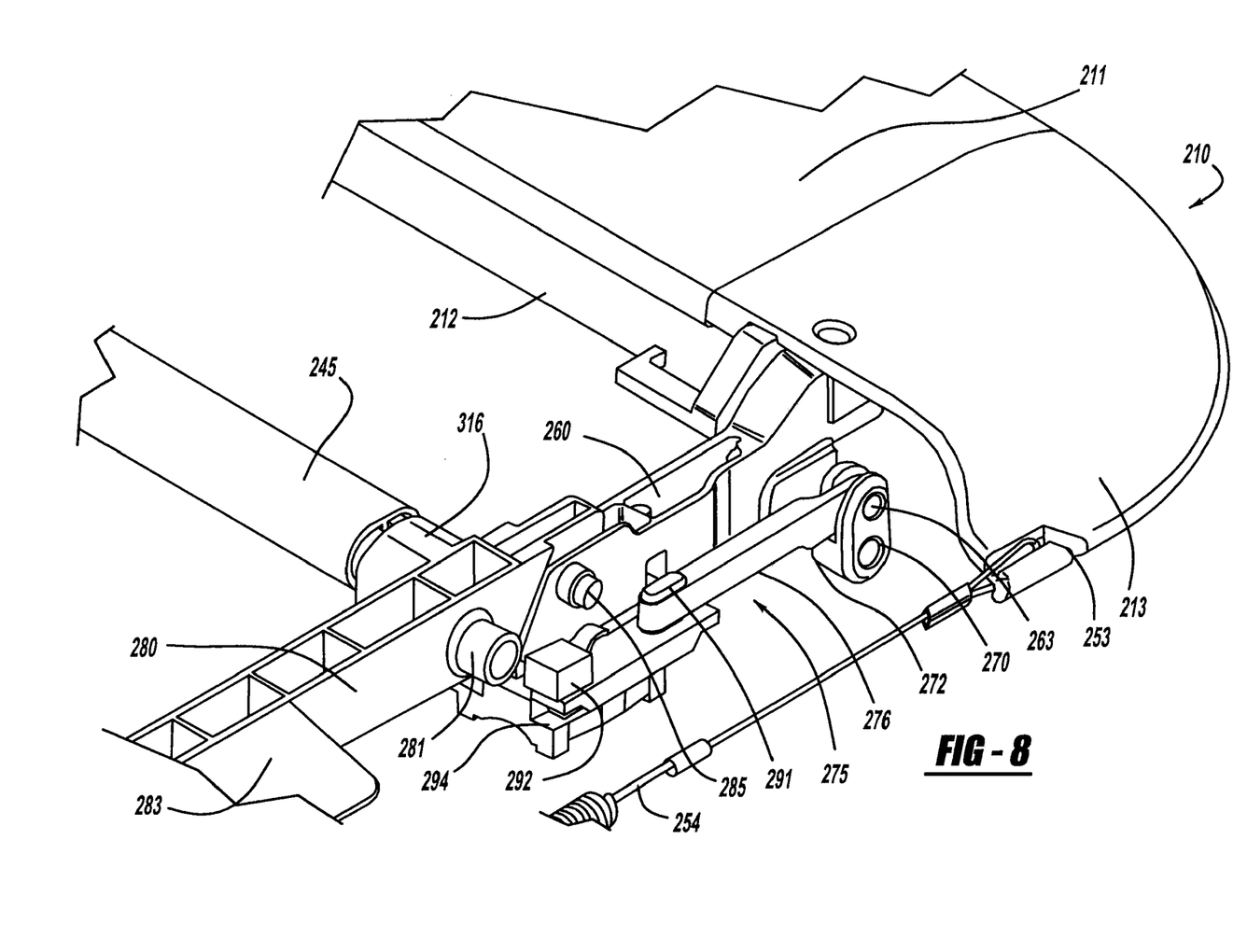
FIG. 8 is a perspective view showing an end bow lift assembly employed in the open air system, according to the present disclosure.
Figure 9:
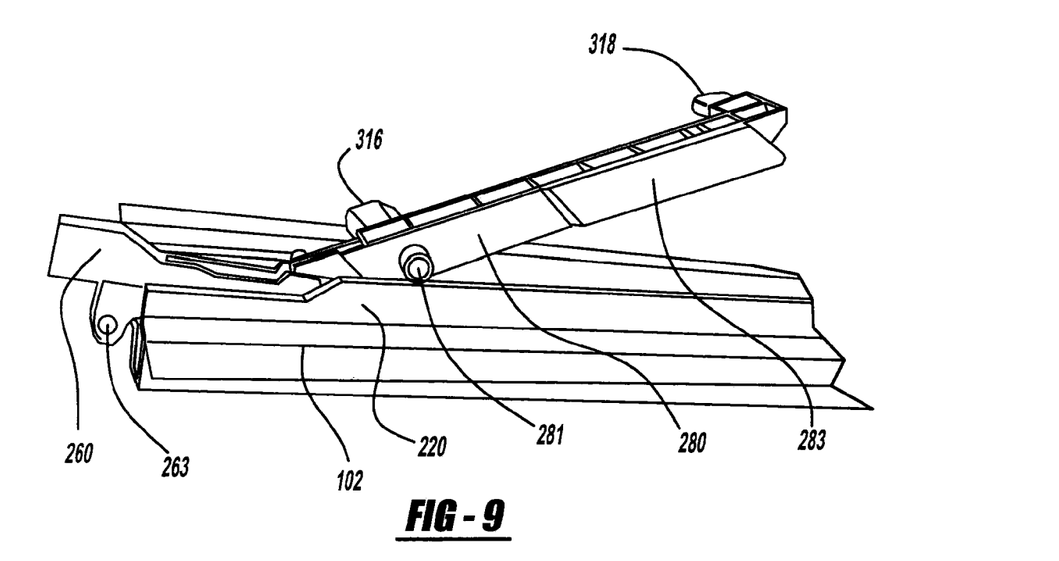
FIG. 9 is a side elevational view showing a first lift arm employed in the open air system, according to the present disclosure.
Figure 10:
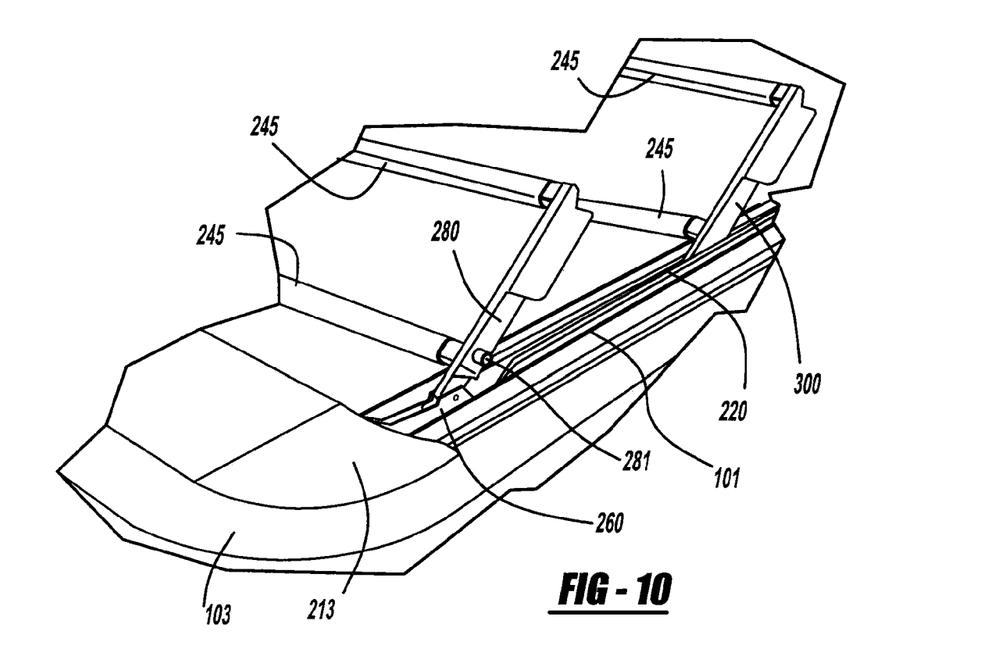
FIG. 10 is a perspective view showing the first lift arm with connect cross bows and the lift assembly with connected cross bows employed in the open air system, according to the present disclosure.

FIG. 7 is a cross sectional view illustrating cross bow 245. Moveable surface 110 includes cross bow 245 which may be fabricated from preferably aluminum or alternatively, plastic, carbon fiber, metal alloys, and the like. Headliner 132 may include a seam 133 that creates a pocket 134 along cross bow 245. Alternatively, headliner 132 may be attached to cross bow 245 using an adhesive with out seam 133 and pocket 134.

With reference to FIGS. 8-12, a front bow lift mechanism 275 is illustrated. Front bow 210 comprises top member 211, bottom member 212, and a corner piece 213. Front bow 210 is connected to connection member 260. Lift mechanism 275 includes connection member 260, a front lift arm 280, a cam 270, a slider member 276 and a track glider 294. Connection member 260 includes a pin 263 to which cam 270 and a slider member 276 are connected. Slider member 276 includes a polymeric glider element 291. Connection member 260 and slider member 276 are connected to track glider 294. In addition, connection member 260 has a polymeric stop 292.

First front lift arm 280 includes a pair of appendages 316 and 318 for connecting to cross bows 245. The appendages 316, 318 are above pivot point which is at a pin 285 when open air system 100 is in an open position. Front lift arm 280 also includes a flag 283 which assists in keeping moveable surface 110 taunt when open air system 100 is in a closed position. The front lift arm 280 includes a guide 281, which is located on a side opposite of appendages 316, 318. Guide 281 rides along a lift ramp 220 to provide stabilization of moveable surface 110 when in an open position.

A drive cable pulls on lift mechanism 275 which engages a cam guide 272 along a cam ramp 273 thereby lifting front bow 210 above seal 103 so that moveable surface 110 may be moved towards the aft end of vehicle 121. Slider member 276 moves along a slider channel 277 and prevents front bow 210 from being raised too high above seal 103 or from being bent backwards from the wind striking it as the vehicle is in forward movement. As track glider 294 moves along first track 101, front lift arm 280 engages lift ramp 220. Lift ramp 220 assists front lift arm 280 in raising upward and provides a limit as to how far front lift arm 280 may move back. In addition, cam 270 allows lift mechanism 275 to lift front bow 210 up off of seal 103 instead of pulling front bow 210 across seal 103. This lifting of front bow 210 significantly reduces wear on seal and moveable surface 110. It will be apparent that lift mechanism 275 without front lift arm 280 can be employed on rear bow 218.

Figure 11:
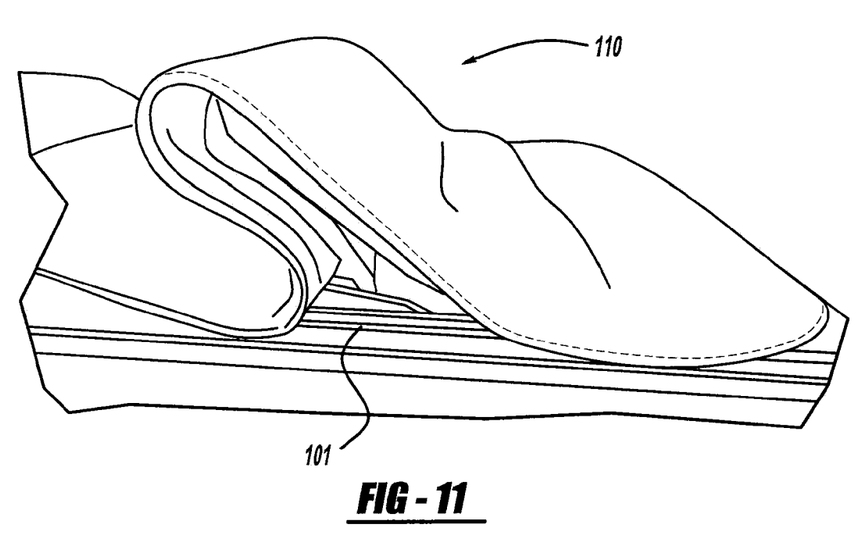
FIG. 11 is a side elevational view showing a flexible roof employed in the open air system positioned as a wind deflector, according to the present disclosure.
Figure 12:
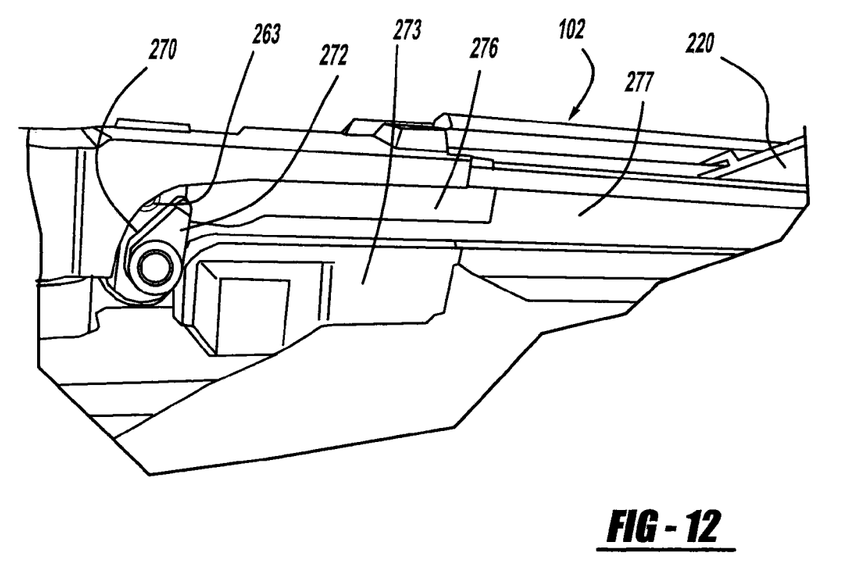
FIG. 12 is a fragmentary side elevational view showing a cam of a end bow lift assembly employed in the open air system, according to the present disclosure.
Figure 13:
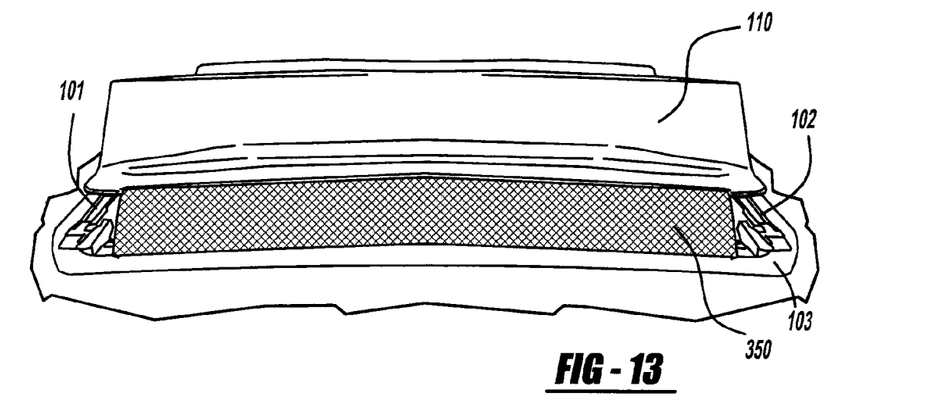
FIG. 13 is a front elevational view showing a flexible roof employed in the open air system positioned as a wind deflector, according to the present disclosure.
Figure 14:
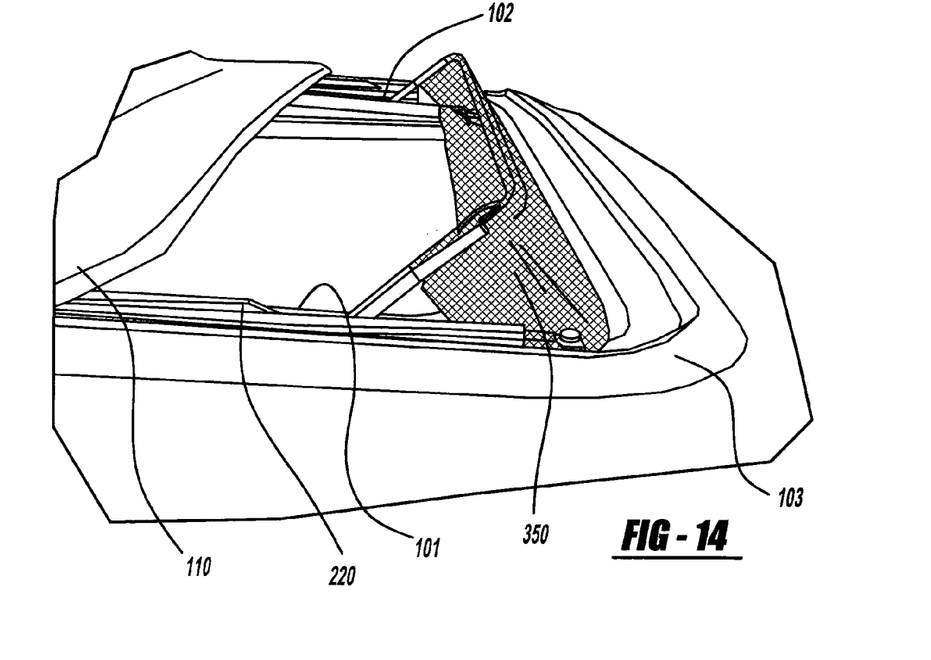
FIG. 14 is a side view showing a forward portion of the open air system, according to the present disclosure.
Figure 15:
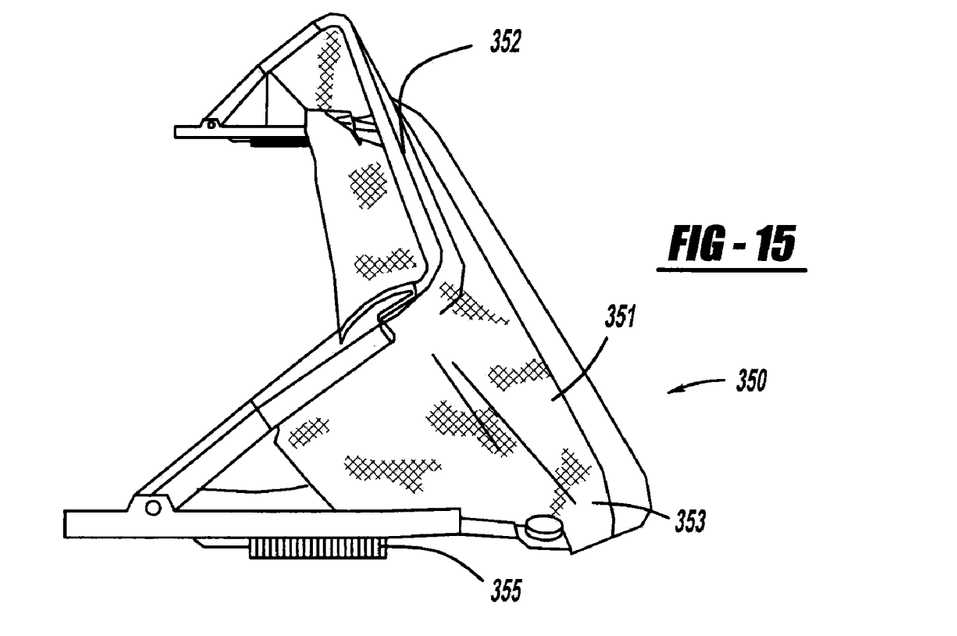
FIG. 15 is a perspective view showing an air deflector employed in the open air system, according to the present disclosure.
Figure 16:
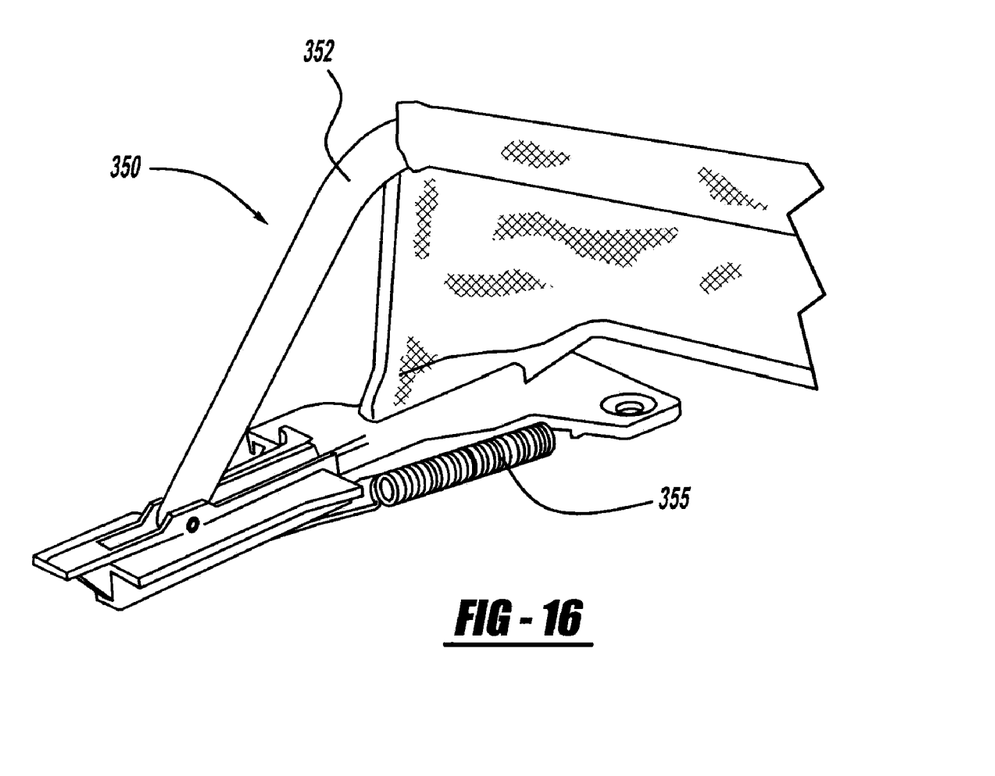
FIG. 16 is an enlarged diagrammatic perspective view showing a bias member of the air deflector.

Moveable surface 110 raises up and provides a wind deflection, as illustrated in FIG. 11, such that the wind travels over moveable surface 110 and the remainder of moveable surface 110 does not oscillate in the wind. Otherwise, this oscillation in the wind by moveable surface 110 can be very irritating to occupants of vehicle 121 and may be described as a caterpillaring effect. In such a caterpillaring effect, moveable surface 110 will bounce up and down or oscillate and undesireably create noise, low frequency vibration, reduced head room in the interior of vehicle 121, breakage of components in open air system 100 and the like. This caterpillaring effect is especially prone on larger roof openings often on larger vehicles, such as sport utility vehicles. But in the present invention, guide 281 running along ramp 220 positions a first fold within moveable surface 110 such that the caterpillar effect is significantly reduced if not entirely eliminated. Front lift arm 280 is connected to two cross bows 245 which are connected to a mirror image of front lift arm 280 to create an assembly. When the assembly is pushed by the wind, the assembly cannot move any further back than guide 281 allows on lift ramp 220. This is very stable and provides a very desirable wind deflector for moveable surface 110. In an alternative embodiment, if moveable surface 110 is opened from the aft, moveable surface 100 raises up as described herein and operates as an air deflector thus minimizing buffeting in the interior compartment of vehicle 121.

With reference to FIGS. 13-16, open air system 100 is illustrated with an additional air deflector 350, which is used to further minimize wind buffeting effects in the interior of vehicle 121. Air deflector 350 includes a member 353 that is attached to vehicle 121 as well as attached to a moving member 352 with a biasing member 355 at their connection. Biasing member 355 which can be a coil spring, allows air deflector 350 to be open when moveable surface 110 is open. When moveable surface 110 closes, it exerts pressures on moving member 352 that are greater than biasing member 355, thus closing air deflector 350. Air deflector 350 also includes cross-vehicle components which are mirror images on the opposite side of vehicle 121. The components of air deflector 350 make a frame that is wrapped by a perforated fabric sheet 351. Sheet 351 is foldable such that it does not inhibit the closing of member 352 as it moves in relationship to the closing of moveable surface 110.

The embodiments and examples described herein are exemplary and not intended to be limiting in describing the full scope of devices, apparatus, systems, and methods of the present disclosure. Equivalent changes, modifications and variations of the embodiments, materials, compositions and methods can be made within the scope of the present disclosure, with substantially similar results.

What is claimed is:

1. An assembly comprising:
   a guide track having a substantially horizontal and longitudinally extending channel, and a longitudinally extending ramp;
   a slider piece including a first portion that resides in and moveably travels along the channel;
   oppositely positioned lift arms, at least one of which being connected to the slider piece, the arms being moveable from a neutral position to a lift position;
   cross bows connected to and spanning between the arms;
   a guide member located on at least one of the arms, the guide member engaging with the ramp to operably secure the arm in the lift position;
   a flexible cover attached to and flexibly spanning between the cross bows for covering an adjacent opening when in a closed position; and
   a front end bow slidable fore and aft, the front end bow being in the same substantially horizontal orientation regardless of the arm position;
   wherein movement of the arms to the lift position raises an adjacent portion of the flexible cover to an angled wind deflecting orientation between the cross bows and rearward of the front end bow, the wind deflecting orientation reducing a caterpillaring movement of the cover when the front end bow is rearwardly moved to an open position, and a center of the portion of the cover being flexible when in the wind deflecting orientation.

2. The assembly according to claim 1 further comprising a sport utility vehicular roof opening operably covered by the flexible cover.

3. The assembly according to claim 1 further comprising a second pair of lift arms and an additional set of cross bows connected to and spanning between the second pairs of lift arms.

4. The assembly according to claim 1 wherein a front edge of the cover is rearwardly moveable and a rear edge of the cover is forwardly moveable.

5. The assembly according to claim 1 further comprising a structure extending from each of the lift arms and assisting in sealing of the flexible cover.

6. The assembly according to claim 1 further comprising means for attaching and moving each of the lift arms relative to the associated slider.

7. The assembly according to claim 1 further comprising additional sliders and lift arms coupling portions of the cover to the tracks, and a guide-to-lift ramp interaction assisting in minimizing caterpillaring of the cover.

8. The assembly according to claim 1 further comprising a rear end bow extending in a cross-vehicle direction and being attached to a rearmost portion of the cover, the rear end bow being moveable in a fore-and-aft direction in response to a motor-driven cable.

9. The assembly according to claim 1 wherein the flexible cover is a sunroof cover which is operable above a passenger compartment, and further comprising a rear end bow slidable fore and aft due to electric motor actuation, the flexible cover spanning between the front and rear end bows.

10. An assembly comprising:
   a roof having an opening therein;
   a track being elongated in a substantially horizontal direction;
   sliders travelling along the track;
   lift arms moveable to a lift position;
   cross bows connected to and spanning between the arms;
   a guide member located on at least one of the arms, the guide member engaging a ramp and operably locating the arm in the lift position;
   a flexible roof cover attached to and flexibly spanning between the cross bows for covering the opening when in a closed position; and
   a front end bow slidable fore and aft in response to movement of the sliders relative to the track, the front end bow being in the same substantially horizontal orientation regardless of the arm position;
   wherein movement of the arms to the lift position raises an adjacent portion of the flexible roof cover to an angled wind deflecting orientation between the cross bows and rearward of the front end bow, the wind deflecting orientation reducing a caterpillaring movement of the cover when the front end bow is rearwardly moved to an open position, and a center of the portion of the cover being flexible when in the wind deflecting orientation; and
   wherein a front edge of the flexible roof cover is rearwardly moveable and a rear edge of the flexible roof cover is forwardly moveable depending on an opening condition desired, and the adjacent portion of the flexible roof cover is automatically moved to the angled wind deflecting orientation when the rear edge is forwardly moved to reduce interior wind buffeting.

11. The assembly according to claim 10 wherein the roof is a sport utility vehicular roof having the opening operably covered by the flexible cover.

12. The assembly according to claim 10 further comprising a structure extending from each of the lift arms and assisting in sealing of the flexible cover.

13. The assembly according to claim 10 further comprising:
   means for moving a slider in a substantially fore-and-aft direction; and
   means for attaching and moving at least one of the lift arms relative to the slider.

14. The assembly according to claim 10 further comprising a rear end bow extending in a cross-vehicle direction and being attached to a rearmost portion of the cover, the rear end bow being moveable in a fore-and-aft direction in response to a motor-driven cable.

15. An assembly comprising:
   a guide track having a longitudinally extending channel;
   a member that moveably travels along the channel;
   oppositely positioned lift arms, at least one of which being moved by the member, the arms being moveable to a lift position via a guide engaging a ramp;
   at least one cross bow connected to and spanning between the lift arms;
   a flexible sunroof cover attached to and flexibly spanning between the at least one cross bow for covering an adjacent sunroof opening when in a closed position;
   a front end bow slidable fore and aft, the front end bow being in the same substantially horizontal orientation regardless of the lift arm position; and
   a rear end bow extending in a cross-vehicle direction and being attached adjacent to a rearmost portion of the flexible sunroof cover, the rear end bow being moveable in a fore-and-aft direction in response to a motor-driven cable;
   wherein movement of the arms to the lift position raises an adjacent portion of the flexible sunroof cover to an angled wind deflecting orientation rearward of the front end bow, the wind deflecting orientation reducing a caterpillaring movement of the cover when the front end bow is rearwardly moved to an open position, and a majority of the sunroof cover being flexible when in the wind deflecting orientation.

16. The assembly according to claim 15 further comprising additional lift arms and an additional cross bow connected to and spanning between the additional lift arms.

17. The assembly according to claim 15 wherein a front edge of the flexible sunroof cover is rearwardly moveable and a rear edge of the flexible sunroof cover is forwardly moveable.

18. The assembly according to claim 15 further comprising a structure extending from each of the lift arms and assisting in sealing of the flexible sunroof cover.

19. The assembly according to claim 15 further comprising means for attaching and moving each of the lift arms relative to the associated member.

20. The assembly according to claim 15 further comprising a tensioning cable extending in the fore-and-aft direction and being located within a pocket of a seal spaced inboard from a lateral edge of the flexible sunroof cover, when the flexible sunroof cover is in the closed position.

* * * * *